(12) United States Patent
Madhani et al.

(10) Patent No.: US 7,042,165 B2
(45) Date of Patent: May 9, 2006

(54) DRIVER CIRCUIT FOR LED VEHICLE LAMP

(75) Inventors: Vipin Madhani, Burlington, MA (US); Andrew O. Johnsen, Danvers, MA (US)

(73) Assignee: Osram Sylvania Inc., Danvers, MA (US)

(*) Notice: Subject to any disclaimer, the term of this patent is extended or adjusted under 35 U.S.C. 154(b) by 36 days.

(21) Appl. No.: 10/926,674

(22) Filed: Aug. 26, 2004

(65) Prior Publication Data
US 2005/0057179 A1  Mar. 17, 2005

Related U.S. Application Data

(60) Provisional application No. 60/498,244, filed on Aug. 27, 2003.

(51) Int. Cl.
*H05B 37/02* (2006.01)
*H01B 37/00* (2006.01)

(52) U.S. Cl. .................. 315/185 R; 315/224; 315/244; 315/291; 315/186; 315/192; 315/242; 315/209 R

(58) Field of Classification Search ............ 315/185 R, 315/224, 291, 244, 192, 246, 186, 209 R
See application file for complete search history.

(56) References Cited

U.S. PATENT DOCUMENTS

| 5,742,133 A | 4/1998 | Wilhelm et al. ............. 315/291 |
| 6,362,578 B1* | 3/2002 | Swanson et al. ............. 315/307 |
| 6,586,890 B1* | 7/2003 | Min et al. .................... 315/224 |
| 6,836,081 B1* | 12/2004 | Swanson et al. ............. 315/307 |
| 6,853,150 B1* | 2/2005 | Clauberg et al. ........ 315/185 R |

* cited by examiner

*Primary Examiner*—Shih-Chao Chen
*Assistant Examiner*—Chuc Tran
(74) *Attorney, Agent, or Firm*—Carlo S. Bessone

(57) ABSTRACT

A first vehicle lamp driver circuit for a light emitting diode (LED) array, the LED array having a first string of four LEDs in series and a second string of four LEDs in series. A first LED driver drives the first LED string and a second LED driver drives the second LED string. In a STOP mode of operation, the current to both LED strings is controlled by the LED driver in series with the LED string. In a TAIL mode of operation, the current is provided to only one LED string via a series connected diode and resistor. When there is reduced input voltage, operation of the LED strings is provided by switching circuits that short-out one LED in each LED string. A second vehicle lamp driver circuit comprises a first LED string and a second LED string in series with a control switch having a feedback circuit for maintaining constant current regulation to control the sum of the current in each LED string and reduce switching noise.

13 Claims, 2 Drawing Sheets

DRIVER CIRCUIT FOR LED VEHICLE LAMP

CROSS-REFERENCE TO RELATED APPLICATIONS

This is a non-provisional Patent Application claiming priority of provisional application for patent No. 60/498,244 filed Aug. 27, 2003.

BACKGROUND OF THE INVENTION

1. Field of the Invention

This invention relates generally to light emitting diodes (LEDs) used in light sources in automobiles and other vehicles, and in particular to a driver circuit that provides linear regulated current and reduced input voltage operation.

2. Description of Related Art

Advances in light emitting diodes (LEDs) have made LEDs very attractive for use in vehicles because of their long operation life, higher efficiency and low profile. LED light output is proportional to the LED current, and therefore, a current source is the preferred method of driving the LEDs. When LEDs are used in higher power applications such as the rear combination lights (STOP/TURN/TAIL), lower efficiency, cumbersome current regulation, switching noise and cost have been problems along with a desire to operate over a reduced input voltage range.

Prior art patents include U.S. Pat. No. 5,742,133 issued Apr. 21, 1998 to Wilhelm Wilhelm et al and assigned to Siemens Aktiengesellschaft of Munich, Germany discloses a driver circuit for a LED comprising a switch device connected to a LED controlled by an input signal and having a current source. The switch device short-circuits the LED after a transition to a first switching state, and the switch device supplies the LED from the current source after a transition to a second switching state. However, this switching driver circuit produces unwanted switching noise and does not have a TAIL light capability.

U.S. Pat. No. 6,362,578 issued Mar. 26, 2002 to David F. Swanson et al and assigned to STMicroelectronics, Inc. of Carrollton, Tex. which discloses a LED driver circuit having a PWM controller for setting a PWM duty cycle for LED arrays of light emitting diodes (LEDs) to determine the brightness of the LEDs. However, hard switching of the LEDs ON and OFF occurs which causes switching noise to be generated and the switching noise makes it difficult to meet automotive requirements for radiated and conducted emissions. U.S. Pat. No. 6,586,890 issued Jul. 1, 2003 to Young-Kee Min et al and assigned to Koninklijke Philips Electronics, N.V. of Eindhoven, NL discloses a LED driver circuit for providing power to LEDs using pulse width modulation (PWM). Current feedback is used to adjust power to LED arrays and provides a full light and dim light modes of operation. A frequency is selected to limit electromagnetic interference (EMI). However, a power supply must be provided to account for variation in the input voltage to keep the string of LED's supplied with enough voltage.

SUMMARY OF THE INVENTION

Accordingly, it is therefore an object of this invention to provide a driver circuit for a high efficiency LED Vehicle Lamp with low switching noise having TAIL and STOP modes of operation.

It is another object of this invention to sense failure modes in the LED strings of the LED Vehicle Lamp and shut down the driver circuit.

It is yet another object of this invention to sense low input voltage and reconfigure the LED strings to maintain continued operation with legal light intensity.

It is a further object of this invention to provide a LED driver circuit having a constant current generator that controls the sum of the current in each string of the LED array.

It is another object of this invention to provide a LED driver circuit to provide low and high power modes for Tail and Stop automotive requirements.

These and other objects are accomplished by providing a first embodiment of a LED Driver comprising a means for driving a first LED string in response to a STOP signal, means for driving a second LED string in response to the STOP signal, means for detecting a predetermined drop in an input voltage (VIN) to the driver and generating a bypass signal, means connected across at least one LED in the first LED string for bypassing the at least one LED in response to the bypass signal from the detecting means, means connected across at least one LED in the second LED string for bypassing the at least one LED in response to the bypass signal from the detecting means. The driver comprises means for shutting-off the first driving means and the second driving means when the STOP signal is in a non-active state and a TAIL signal is in an active state, and means for providing a current source to the first LED string in response to the active TAIL signal. The first driving means comprises a first transistor switch in series with a first current limiting resistor. The second driving means comprises a second transistor switch in series with a second current limiting resistor. The detecting means comprises means for generating a voltage reference signal, and means for comparing a portion of the input voltage to the voltage reference signal and generating the detecting means bypass signal when the predetermined drop in the input voltage occurs.

The objects are further accomplished by providing a second embodiment of a LED driver comprising a first LED string having an anode of a first LED connected to an input voltage (VIN) and a cathode of a last LED connected to a first current sensing resistor, a second LED string having an anode of a first LED connected to the input voltage and a cathode of a last LED connected to a second current sensing resistor, a control switch connected to the first current sensing resistor and the second current sensing resistor for providing regulation of current passing through the first LED string and the second LED string in response to a STOP signal and a TAIL signal provided to the LED driver, a feedback circuit connected to the control switch for controlling the control switch and the current passing through the first LED string and the second LED string in accordance with the state of the STOP signal and the TAIL signal. The driver comprises means for generating a pulse signal when the TAIL signal is active, the pulse signal being connected to the feedback circuit causing the control switch to reduce an average current through the first LED string and the second LED string for reduced light output. The control switch comprises a pass transistor in series with a current sensor. The feedback circuit is connected to the control switch current sensor and regulates the current of the pass transistor to provide a linear current through the first LED string and the second LED string when the STOP signal is active and when the TAIL signal is active.

Further in the second embodiment, the first LED string comprises a first transistor switch circuit connected to an anode of a last LED in the first LED string for bypassing the last LED in response to a first low input voltage signal. The second LED string comprises a second transistor switch connected to an anode of a last LED in the second LED string for bypassing the last LED in response to a second low input voltage signal. The driver comprises, means for generating a voltage reference signal, and means for comparing the input voltage to the voltage reference signal and generating the first low input voltage signal and the second low input voltage signal in accordance with a predetermined drop in the input voltage signal. The driver comprises a means for monitoring a first voltage across the first current sensing resistor, and when an open circuit is detected generating a first failure signal, means for monitoring a second voltage across the current sensing resistor, and when an open circuit is detected generating a second failure signal, and the first failure signal and the second failure signal being connected to the feedback circuit for turning off the control switch when either one of the first failure signal or second failure signal occurs.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
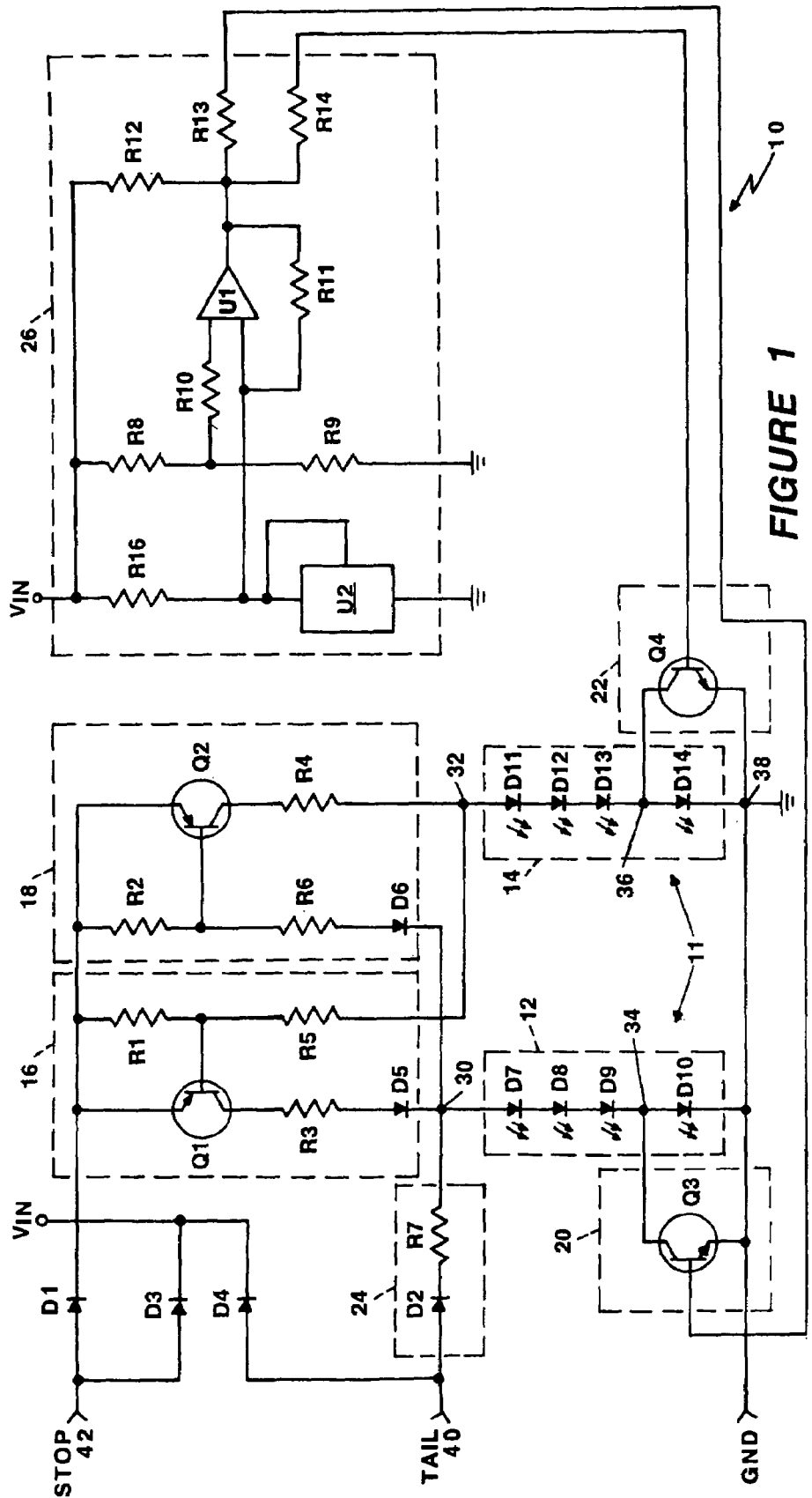
FIG. 1 is a schematic diagram of a first embodiment of an LED vehicle lamp driver circuit according to the present invention.

Referring to FIG. 1, a schematic diagram of a first embodiment of a vehicle lamp driver circuit 10 is shown for driving an array 11 of light emitting diodes (LEDs) according to the present invention. The driver circuit 10 provides current via first LED Driver 16 and second LED driver 18 to an array 11 of LEDs arranged in two rows of four series connected LEDs, LED strings 12 and 14. The driver circuit 10 receives two control inputs, TAIL 40 (for tail lights) and STOP 42 (for stop lights), and has four output connections 30, 32, 34, 36 for connecting to the first LED string 12 and second LED string 14. The Tail 40 input causes the driver circuit 10 to operate in a TAIL mode, and the STOP 42 input causes the device circuit to operate in a STOP mode.

The first LED string 12 comprises four LEDs D7, D8, D9, and D10 connected in series. The series connections are from cathode to anode with the cathode of the last LED D10 connected to the common ground lead of a motor vehicle and the driver circuit common ground 38. The second LED string 14 comprises four LEDs D11, D12, D13, and D14 connected in series. The series connections are from cathode to anode with the cathode of the last LED D14 connected to the common ground 38. The driver circuit output 30 connects to the LED string 12 at the anode of LED D7, the driver circuit output 34 connects to the anode of D10, and the cathode of LED D10 connects to the common ground 38. The driver circuit output 32 connects to the LED string 14 at the anode of LED D11. The driver circuit output 36 connects to the anode of LED D14, and the cathode of LED D14 connects to the common ground 38. The LEDs D7–D14 may be embodied by model LAG 67 F, manufactured by OSRAM Opto Semiconductors.

The first LED driver 16 comprises a transistor Q1, biasing resistors R1 and R5, current limiting resistor R3 and diode D5 which is a reverse polarity protection diode, and the LED driver output 30 drives the first LED string 12. The LED driver 16 provides a fixed current source to the first LED string 12, and the fixed current source compensates for variations in the input voltage VIN to the LED string 12 and the voltage drop across each LED D7–D10.

The second LED driver 18 comprises a transistor Q2, biasing resistors R2 and R6, current limiting resistor R4, and Diode D6, which is a reverse polarity protection diode, and the LED driver output 32 drives the second LED string 14. The second LED driver 18 functions similarly to the first LED driver 12 by providing a fixed current source to the second LED string 14 which compensates for variations in the voltage drop across each of LEDs D11–D14 and variations in the input voltage, VIN.

Still referring to FIG. 1 a voltage reference/comparator circuit 26 is provided to monitor the input voltage, VIN, and activate Switch 20 and Switch 22. Switch 20 is connected in parallel with the last LED D10 in the first LED string 12, and Switch 22 is connected in parallel with the last LED D14 in LED string B14. When Switch 20 and Switch 22 are activated by signals from the voltage reference/comparator circuit 26, they short-out or bypass the last LEDs D10 and D14 respectively in each LED string 12, 14, thereby effectively reducing the minimum voltage required to operate the first LED string 12 and the second LED string 14. This results in the driver circuit 10 being able to maintain reliable operation of the LED string 12 and the second LED string 14 down to an input voltage VIN of six (6) volts.

The voltage reference and comparator Circuit 26 comprises a voltage reference device U2 and a comparator U1 which compares the input voltage VIN to the reference voltage generated by the reference voltage device U2. The input voltage VIN is sampled by voltage divider R8 and R9. This sampled voltage is compared to U2 reference voltage (2.5V). R10 is to reduce differential input bias current into the differential comparator U1. R11 provides input voltage hysteresis when switching between modes. R12 is used to pull up the output of U1 to drive switch 20 (Q3) and switch 22 (Q4) via R13 and R14.

When the difference between the two input voltages of the voltage reference device U2 reaches a predetermined threshold of 8.5 to 9.0 volts, the differential comparator U1 generates a signal that turns on transistor Q3 in Switch 20 and transistor Q4 in Switch 22, thereby shorting out-LEDs D10 and D14, respectively, to maintain reliable operation of the remaining LED devices D7–D9 and D11–D13.

When the STOP 42 input occurs and the driver circuit 10 operates in the STOP mode, the current to the first LED string 12 is controlled by the first LED driver 16 which is in series with first LED string 12, and the current to the second LED string 14 is controlled by the second LED driver 18 which is in series with the second LED string 14. The LED driver 16 and LED driver 18 operate in a balanced current mode to avoid the effects of variations in the input voltage and LED voltage drops. The first LED driver 16 or the second LED Driver 18 is turned off if the other LED string has a voltage of less than three (3) volts below an applied control voltage across current limiting resistors R3 and R4.

This provides a fail safe feature that prevents operation of the first LED string 12 and the second LED string 14, if one of the LED strings fails "open". Without this feature, an "open" LED string would result in operation of the LED strings 12, 14 at a light intensity below the legal requirements for rear signal lights of a motor vehicle. In addition, this fail safe feature in conjunction with the normal functions of a standard vehicle lighting control module can be used to notify a vehicle driver that a brake light has failed.

When the TAIL 40 input occurs and the driver circuit 10 operates in the TAIL mode, current to only the first LED string 12 is provided by series connected diode D2 and resistor R7. The value of resistor R7 is selected to provide the correct ratio of light output between the TAIL mode and the STOP mode. The advantage of this arrangement is that it permits operation of the individual LEDs D7–D10 in the first LED string 12 at a current level that is well above the forward conduction knee of the LED device, and this provides for less variation in intensity between the individual LED devices in the first LED string 12.

Table 1 lists the preferred values of the components used in the driver circuit 10 of FIG. 1, and Table 2 lists the part number and manufacturer of the active components. One skilled in the art recognizes that other values and other active components may be used in FIG. 1 depending on performance requirements.

TABLE 1

| REFERENCE | VALUE (OHMS) |
| --- | --- |
| R1, R2 | 47K |
| R3, R4 | 20 |
| R5, R6 | 4.7K |
| R7 | 330 |
| R8 | 37.4K |
| R9 | 15K |
| R10, R12 | 10K |
| R11 | 1M |
| R13, R14 | 1K |

TABLE 2

| REFERENCE | MODEL | MANUFACTURER |
| --- | --- | --- |
| D1–D6 | 1N4004G-T | Diodes, Inc. |
| D7–D14 | LAG67F | Osram Semiconductor |
| Q1, Q2 | BC807-16-7 | Diodes, Inc. |
| Q3, Q4 | MMBT4403-7 | Diodes, Inc. |
| U1 | LM2903D | Texas Instruments |
| U2 | LMV431ACM5X | National Semiconductor |

Figure 2:
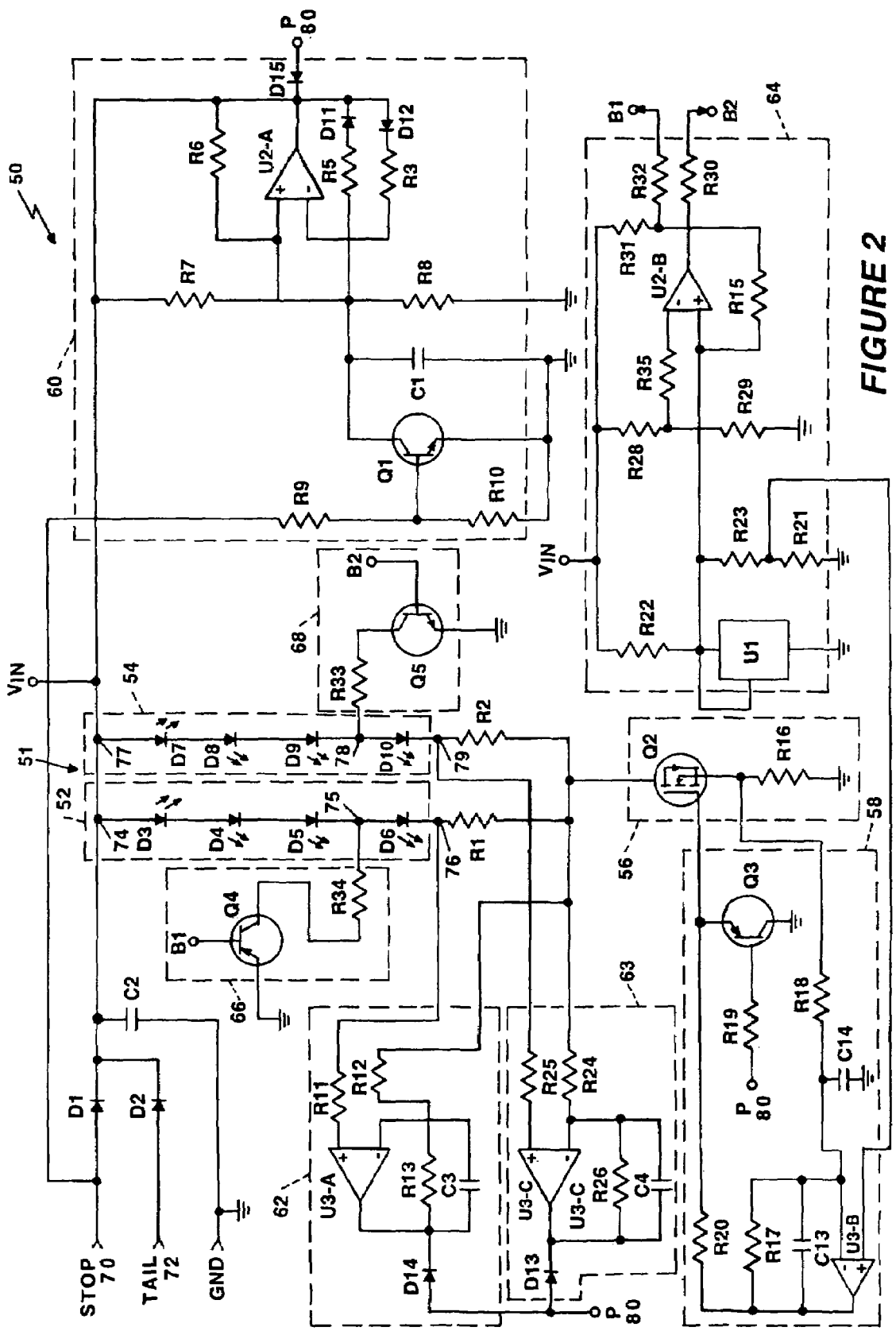
FIG. 2 is a schematic diagram of a second embodiment of an LED vehicle lamp driver circuit according to the present invention.

Referring now to FIG. 2, a schematic diagram of a second embodiment of a vehicle lamp driver circuit 50 is shown for driving an array 51 of light emitting diodes (LEDs) arranged in two rows of 4 series connected LEDs according to the present invention. The driver circuit 50 provides linear regulation of current passing through a first LED string 52 and a second LED string 54. The driver circuit 50 receives two control input signals, STOP 70 and TAIL 72, and has six output connections 74–79 for connecting to the first LED string 52 and the second LED string 54. STOP 70 input causes the driver circuit 50 to operate in a linear mode whereby the current passing through the first LED string 52 and the second LED string 54 stays steady in a linear mode of operation. The TAIL 72 input causes the driver circuit 50 to operate in a pulsed mode whereby an average linear current passes through the first LED string 52 and the second LED string 54 resulting in the light output intensity of the LED array 51 in the TAIL mode to be less than the light output intensity in a STOP mode.

The first LED string 52 comprises four LEDs D3, D4, D5 and D6 connected in series. The series connections are from cathode to anode with the anode of the last LED D6 connected to the driver circuit output 75 and the cathode of the last LED D6 connected to driver circuit output 76. The anode of the first LED D3 is connected to driver circuit output 74. Similarly, the second LED string 54 comprises four LEDs D7, D8, D9 and D10 connected in series. The series connections are made from cathode to anode with the anode of the last LED D10 connected to driver circuit output 78 and the cathode of the last LED D10 connected to driver circuit output 79. The anode of the first LED D7 is connected to driver circuit output 77 and driver circuit outputs 74 and 77 and connected together and to the DC input voltage, VIN.

The first anode of D3 and D7 in each LED string 52, 54 of the LED array 51 are connected together and are powered by the STOP 70 input and the TAIL 72 input through reverse polarity protection diodes D1 and D2. Further, a fault mode current sensing resistor R1 is connected in series with the cathode of LED D6 of the first LED string 52 and the control switch 56. Likewise, a fault mode, current sensing resistor R2 is connected in series with the cathode of LED D10 of the second LED string 54 and the control switch 56. The LEDs D3-D10 may be embodied by model LAG67F, manufactured by OSRAM Sylvania of Danvers, Mass.

The current passing through the first LED string 52 and the second LED string 54 is controlled by control switch 56 and the control switch feedback circuit 58. The control switch 56 comprises a linear current regulator pass transistor Q2 in series with a current sensing resistor R16. The control switch 58 comprises a differential comparator U3-8 which monitors the current regulating sensing resistor R16 and provides a feedback signal to the gate of metal oxide semiconductor field effect transistor (MOSFET) Q2 in the control switch 56. The control switch feedback circuit 58 also includes transistor switch Q3 for pulsing the control switch transistor Q1 in the STOP mode of operation. The constant current regulator provided by control switch 58 permits operation of the driver circuit 50 and LEDs D3–D10 over an extended input voltage range. Operation is possible at 19 volts for approximately one hour and at 24 volts for approximately two minutes.

A first fault switch 62 monitors the voltage across current sensing resistor R1, and a second fault switch 63 monitors the voltage across current sensing resistor R2. When either fault switch 62 or fault switch 63 detects that there is an open circuit fault in either the first LED string 52 or the second LED string 54, the current to the LED string not having the open circuit fault is shut down to prevent operation of the LED array 51 that would result in non-legal light output from the LED array 51. The fault switches 62 and 63 shut down the remaining operating LED string by driving output P 80 low. This signal enters control switch feedback circuit 58 turning Q3 ON and pulling the gate voltage low on Q2, thereby shutting-off all current in the LED strings 52, 54.

The driver circuit 50 comprises an oscillator circuit 60 which generates a pulse signal P 80 for the TAIL mode of operation when the TAIL 72 signal occurs. The time that this signal is high versus the time it is low determines the ratio of Stop mode current to Tail mode current. The duty cycle of this signal is determined by R5 and R3. The combination of R5, R3 and C1 determine the repetition frequency typically set at 5 kHz. The pulse signal P is a digital type signal alternating between a high level Vstop or Vtail minus 1.5 volts and a low level less then one volt of amplitude. The P signal 80 is connected to the control switch feedback circuit 58. The P signal pulses transistor Q3 which controls the gate of Q2 in the control switch 56 pulling the gate low to shut off the current regulator, thereby reducing average current through the LED array 51 and resulting in a reduced light output. The average light output is proportional to the "ON" time of the oscillator circuit 60 and controls the ratio of light output between the STOP and TAIL modes. When the STOP 70 signal occurs, the Q1 transistor in oscillator circuit 60 detects the STOP 70 signal through voltage divider R9, R10, and prevents the differential comparator U2-A from oscillating and generating the P signal. The feedback control circuit 58 now regulates the current of the pass transistor Q2 to provide a steady current through the LED array 51. A comparator circuit U3-B monitors the current sensing resistor R16 and provides a feedback signal to the gate of the MOS-FET transistor Q2 in the control switch 56.

The driver circuit 50 includes a voltage reference and comparator circuit 64, similar to the one in driver circuit 10 for monitoring the input voltage VIN and for controlling a first transistor switch 66 and a second transistor switch 68. The first transistor switch 66 essentially bypasses LED D6 and second transistor switch 68 essentially bypasses LED D10 resulting in the LED array 51 having six operating LEDs instead of eight. Switch 66 and switch 68 are activated by outputs B1 and B2 respectively from the voltage reference and comparator circuit 64 when the input voltage VIN drops below 9 volts. The LED array 51 with the six operating LEDs can operate down to an input voltage of 6 volts.

The voltage reference and comparator circuit 64 comprises a voltage reference device U1 and a comparator circuit U2-B. The voltage reference device U1 creates a 2.5 volt reference for an input to comparator circuit U2-B, and also provides a control voltage for the control switch feedback circuit 58 via voltage divider R21 and R23.

Table 3 lists the preferred values of the components used in the driver circuit 50 of FIG. 2, and Table 4 lists the part number and manufacturer of the active components. One skilled in the art will recognize that other values and other active components may be used in FIG. 2 depending on performance requirements.

TABLE 3

| Reference | Value (OHMS) |
|---|---|
| R1, R2 | 2.6 |
| R3 | 150K |
| R4 | 19K |
| R5 | 13K |
| R6 | 3.3K |
| R7, R8 | 100K |
| R9 | 10K |
| R10 | 2K |
| R11, R12 | 10K |
| R13 | 330K |
| R15 | 1M |
| R16 | 0.68 |
| R17 | 1M |
| R18 | 1K |
| R19, R20, R21 | 2K |
| R22 | 4.7K |
| R23, R24, R25 | 10K |
| R26 | 330K |
| R28 | 37.4K |
| R29 | 15K |
| R30 | 1K |
| R31 | 10K |
| R32 | 1K |
| R33, R34 | 10 |
| R35 | 10K |

TABLE 4

| REFERENCE | MODEL | MANUFACTURER |
|---|---|---|
| D1, D2 | 1N4004G-T | Diodes, Inc. |
| D3, D4, D5, D6 D7, D8, D9, D10 | LAG67F | OSRAM Semi |
| D11, D12, D13, D14, D15 | 1N4001G-T | Diodes, Inc. |
| Q1 | MMBT3904 | Diode, Inc. |
| Q2 | IRFRO14 | IR |
| Q3 | MMBT3906 | Diode, Inc. |
| Q4, Q5 | MMBT4401-7 | Diode, Inc. |
| U1 | LMV431ACM5X | National Semi |
| U2 | LM2903D | Texas Inst. |
| U3 | LM2903D | Texas Inst. |

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A LED Driver comprising:
   means for driving a first LED string in response to a STOP signal;
   means for driving a second LED string in response to said STOP signal;
   means for detecting a predetermined drop in an input voltage (VIN) to said driver and generating a bypass signal;
   means connected across at least one LED in said first LED string, for bypassing said at least one LED in response to said bypass signal from said detecting means;
   means connected across at least one LED in said second LED string for bypassing said at least one LED in response to said bypass signal from said detecting means.

2. The LED array driver as recited in claim 1 wherein said driver comprises;
   means for shutting-off said first driving means and said second driving means when said STOP signal is in a non-active state and a TAIL signal is in an active state; and
   means for providing a current source to said first LED string in response to said active TAIL signal.

3. The LED array driver as recited in claim 1 wherein said first driving means comprises a first transistor switch in series with a first current limiting resistor.

4. The LED array driver as recited in claim 1 wherein said second driving means comprises a second transistor switch in series with a second current limiting resistor.

5. The LED array driver as recited in claim 1 wherein said detecting means comprises means for generating a voltage reference signal; and
   means for comparing a portion of said input voltage to said voltage reference signal and generating said detecting means bypass signal when said predetermined drop in said input voltage occurs.

6. A LED driver comprising:
   a first LED string having an anode of a first LED connected to an input voltage (VIN) and a cathode of a last LED connected to a first current sensing resistor;
   a second LED string having an anode of a first LED connected to said input voltage and a cathode of a last LED connected to a second current sensing resistor;

a control switch connected to said first current sensing resistor and said second current sensing resistor for providing regulation of current passing through said first LED string and said second LED string in response to a STOP signal and a TAIL signal provided to said LED driver;

a feedback circuit connected to said control switch for controlling said control switch and the current passing through said first LED string and said second LED string in accordance with the state of said STOP signal and said TAIL signal.

7. The LED driver as recited in claim 6 wherein said driver comprises means for generating a pulse signal when said TAIL signal is active, said pulse signal being connected to said feedback circuit causing said control switch to reduce an average current through said first LED string and said second LED string for reduced light output.

8. The LED driver as recited in claim 6 wherein said control switch comprises a pass transistor in series with a current sensor.

9. The LED driver as recited in claim 8 wherein said feedback circuit is connected to said control switch current sensor and regulates the current of said pass transistor to provide a linear current through said first LED string and said second LED string when said STOP signal is active and when said TAIL signal is active.

10. The LED driver as recited in claim 6 wherein said first LED string comprises a first transistor switch circuit connected to an anode of a last LED in said first LED string for bypassing said last LED in response to a first low input voltage signal.

11. The LED driver as recited in claim 6 wherein said second LED string comprises a second transistor switch connected to an anode of a last LED in said second LED string for bypassing said last LED in response to a second low input voltage signal.

12. The LED driver as recited in claim 6 wherein said driver comprises;

means for generating a voltage reference signal; and means for comparing said input voltage to said voltage reference signal and generating said first low input voltage signal and said second low input voltage signal in accordance with a predetermined drop in said input voltage signal.

13. The LED driver as recited in claim 6 wherein said driver comprises:

means for monitoring a first voltage across said first current sensing resistor, and when an open circuit is detected generating a first failure signal;

means for monitoring a second voltage across said current sensing resistor, and when an open circuit is detected generating a second failure signal; and said first failure signal and said second failure signal being connected to said feedback circuit for turning off said control switch when either one of said first failure signal or second failure signal occurs.

* * * * *